US011934135B2

(12) United States Patent
Ukawa et al.

(10) Patent No.: US 11,934,135 B2
(45) Date of Patent: Mar. 19, 2024

(54) RECORDING MEDIUM TRANSPORT DEVICE AND IMAGE FORMING APPARATUS

(71) Applicant: FUJIFILM Business Innovation Corp., Tokyo (JP)

(72) Inventors: Takayuki Ukawa, Kanagawa (JP); Mitsuhiro Matsumoto, Kanagawa (JP); Hideki Kuge, Kanagawa (JP); Takayuki Yamashita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 120 days.

(21) Appl. No.: 17/558,251

(22) Filed: Dec. 21, 2021

(65) Prior Publication Data

US 2023/0068115 A1 Mar. 2, 2023

(30) Foreign Application Priority Data

Aug. 25, 2021 (JP) ................................. 2021-137600

(51) Int. Cl.

| | |
|---|---|
| ***B41J 13/22*** | (2006.01) |
| ***B65H 5/00*** | (2006.01) |
| ***B65H 5/08*** | (2006.01) |
| ***G03G 15/00*** | (2006.01) |
| *B41J 2/01* | (2006.01) |

(52) U.S. Cl.

CPC ........ *G03G 15/6511* (2013.01); *B41J 13/223* (2013.01); *B65H 5/085* (2013.01); *B41J 2/01* (2013.01); *B41J 2002/012* (2013.01); *B65H 5/00* (2013.01); *B65H 2404/1441* (2013.01); *B65H 2511/414* (2013.01)

(58) Field of Classification Search

CPC ....... G03G 15/6511; B41J 13/223; B41J 2/01; B41J 2002/012; B65H 5/00; B65H 5/085; B65H 2404/1441; B65H 2511/414

See application file for complete search history.

(56) References Cited

U.S. PATENT DOCUMENTS

2001/0052666 A1* 12/2001 Kuwata .............. B65H 31/3018 271/3.01
2006/0056886 A1* 3/2006 Ohishi .................... B41J 13/025 399/328
2010/0322647 A1* 12/2010 Hosohara ........... G03G 21/1828 399/167
2012/0212552 A1* 8/2012 Houjou ...................... B41J 2/01 118/200

FOREIGN PATENT DOCUMENTS

JP 2006184403 A * 7/2006 ............. G03G 15/20
JP 2006-259223 A 9/2006

* cited by examiner

*Primary Examiner* — Yaovi M Ameh
(74) *Attorney, Agent, or Firm* — Oliff PLC

(57) ABSTRACT

A recording medium transport device includes: a circulating member that forms a part of a transport path for transporting a recording medium; a holding member that is fixed to the circulating member and thereby circulates and holds a front end portion of the recording medium; plural transport cylinders around which the circulating member is suspended and having a recessed part in which the holding member is stored; and a selection part that selects any one of the plural transport cylinders. A mode for stopping the selected one of the plural transport cylinders so that the recessed part of the selected one of the plural transport cylinders is located at a maintenance position is prepared.

20 Claims, 12 Drawing Sheets

RECORDING MEDIUM TRANSPORT DEVICE AND IMAGE FORMING APPARATUS

CROSS-REFERENCE TO RELATED APPLICATIONS

This application is based on and claims priority under 35 USC 119 from Japanese Patent Application No. 2021-137600 filed Aug. 25, 2021.

BACKGROUND

(i) Technical Field

The present disclosure relates to a recording medium transport device and an image forming apparatus.

(ii) Related Art

Japanese Unexamined Patent Application Publication No. 2006-259223 discloses a technique related to a fixation device that fixes, on a recording medium, an image drawn on the recording medium by using particles containing at least a resin. This fixation device includes a fixation roller pair at last one of which is a heating roller and at least one of which has an exchangeable superficial layer, an attaching part including an attaching member, a charging part that charges at least one of the recording medium and the attaching part, and a fixing part that physically fixes a front end portion of the recording medium in a transport direction to the attaching part by a gripping part. The attaching member and the recording medium are electrostatically adsorbed by the charging part, and the recording medium is fixed to the attaching member by the fixing part. Then, the recording medium is transported together with the attaching part while being held between the fixation roller pair, and thereby an image is fixed.

SUMMARY

Aspects of non-limiting embodiments of the present disclosure relate to reducing an amount of work for stopping a recessed part of a transport cylinder at a maintenance position as compared with a case where a worker stops the recessed part at the maintenance position by inching the transport cylinder.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a recording medium transport device including: a circulating member that forms a part of a transport path for transporting a recording medium; a holding member that is fixed to the circulating member and thereby circulates and holds a front end portion of the recording medium; plural transport cylinders around which the circulating member is suspended and having a recessed part in which the holding member is stored; and a selection part that selects any one of the plural transport cylinders, wherein a mode for stopping the selected one of the plural transport cylinders so that the recessed part of the selected one of the plural transport cylinders is located at a maintenance position is prepared.

BRIEF DESCRIPTION OF THE DRAWINGS

Exemplary embodiments of the present disclosure will be described in detail based on the following figures, wherein.

DETAILED DESCRIPTION

First Exemplary Embodiment

An image forming apparatus according to a first exemplary embodiment of the present disclosure is described.

Figure 9:
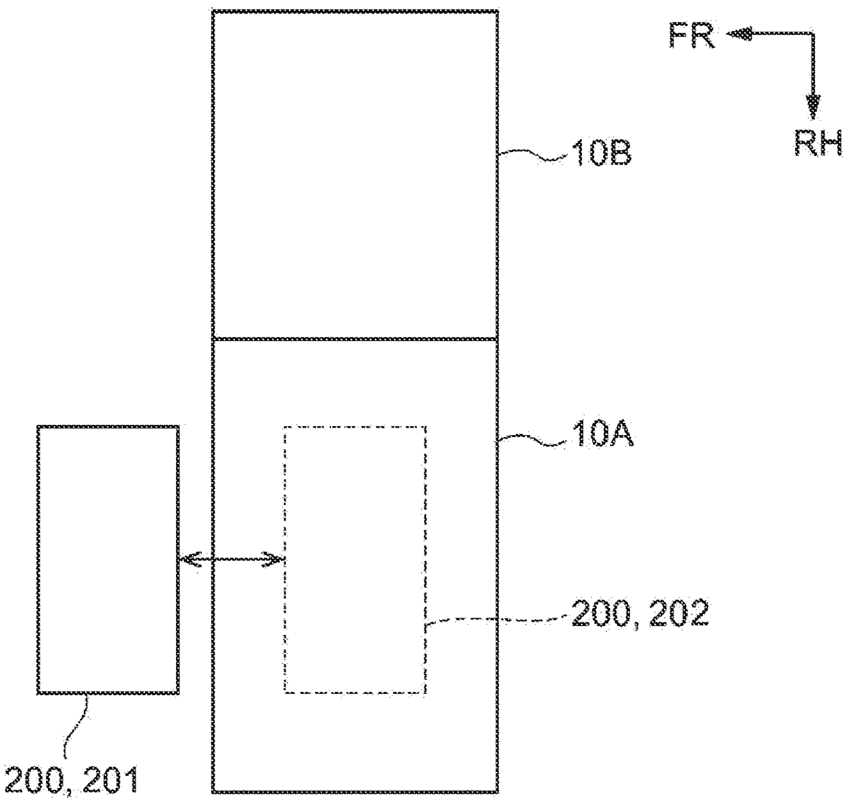
FIG. 9 is a plan view of a state where a transport unit has been drawn out.

Note that arrows UP in the drawings indicate an apparatus vertically upward direction. Arrows RH indicate a horizontally rightward direction in front view of the apparatus. In the following description, an up-down direction means the up-down direction of the apparatus illustrated in FIG. 1 unless otherwise specified. In the following description, a left-right direction means a left (=L) and right (=R) direction in front view of the apparatus illustrated in FIG. 1 unless otherwise specified. In the following description, a depth direction (=near and far) means a depth direction in front view of the apparatus illustrated in FIG. 1 unless otherwise specified. As illustrated in FIG. 9, arrow FR indicates a near side in the depth direction. Note that a side opposite to the side indicated by arrow FR is a far side.

Overall Configuration of Image Forming Apparatus

Figure 1:
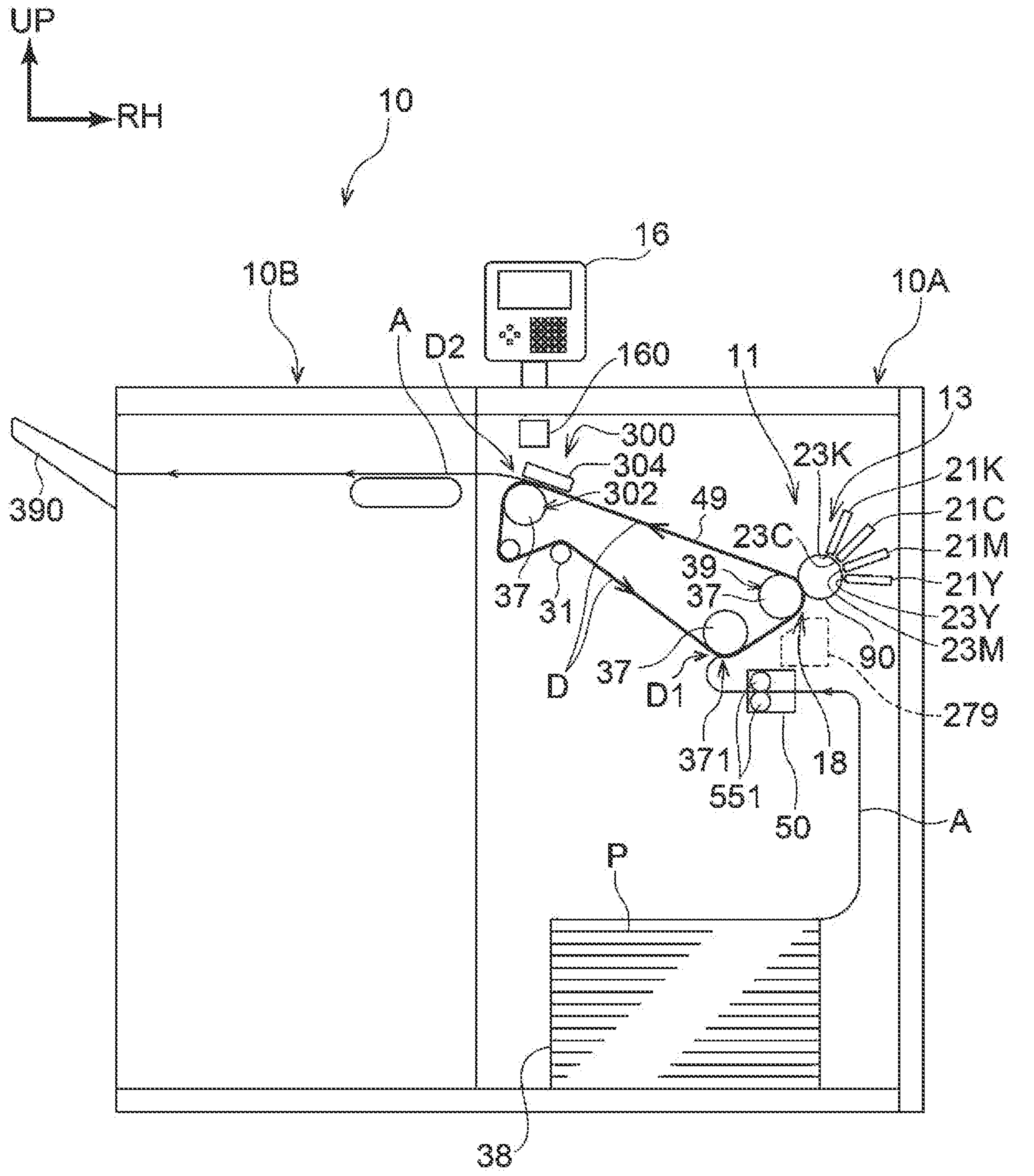
FIG. 1 is a front view illustrating an image forming apparatus according to a first exemplary embodiment.

First, a configuration of an image forming apparatus 10 is described. FIG. 1 is a front view illustrating an outline of the image forming apparatus 10.

As illustrated in FIG. 1, the image forming apparatus 10 includes a unit 10A on a right side and a unit 10B on a left side in FIG. 1. The unit 10A on the right side in FIG. 1 includes a droplet image forming part 11 that forms an image on a sheet P, which is an example of a recording medium.

Figure 2:
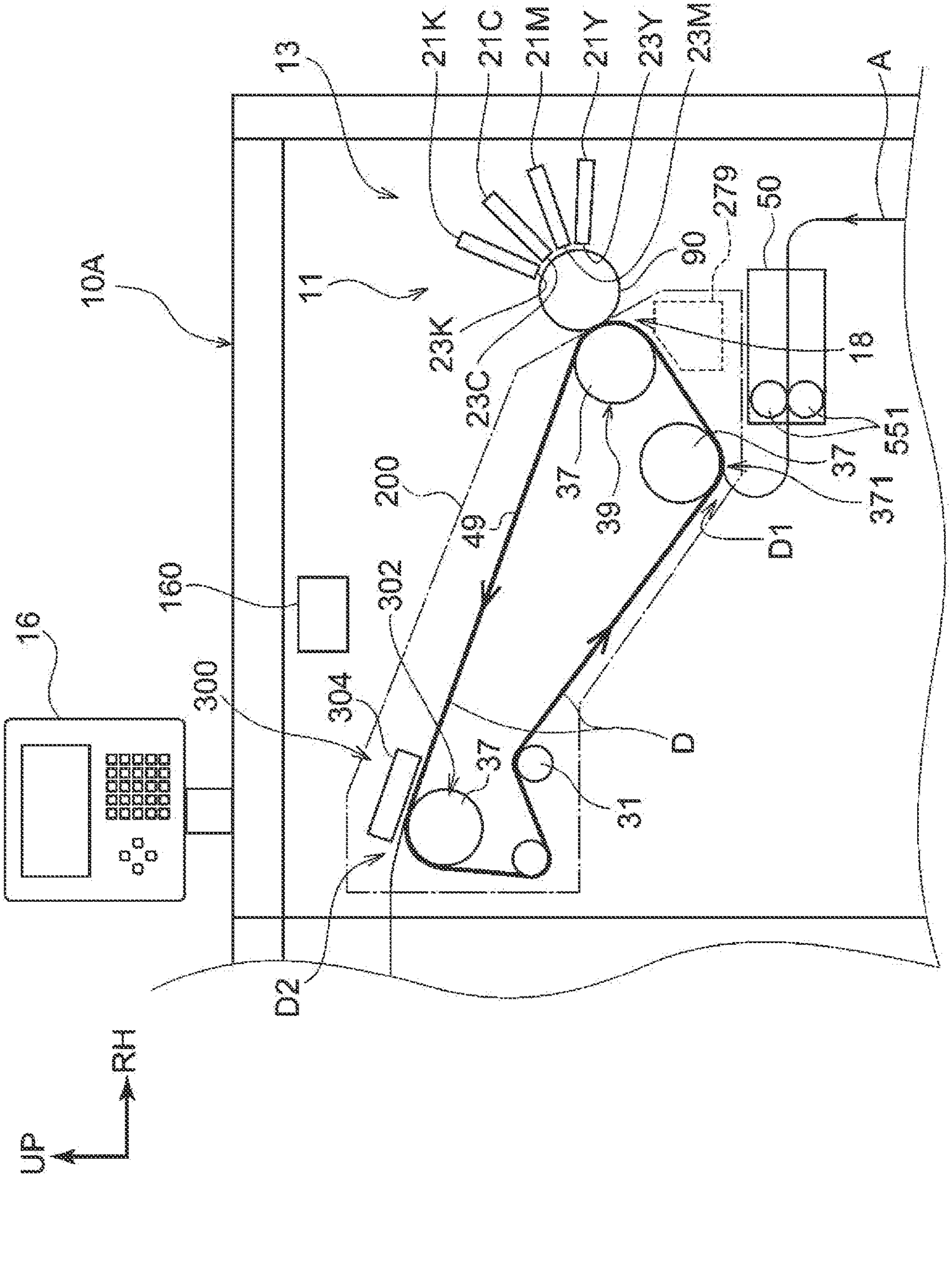
FIG. 2 is a front view of an image forming part of the image forming apparatus according to the first exemplary embodiment.

As illustrated in FIGS. 1 and 2, the droplet image forming part 11 includes a droplet ejection mechanism 13 that forms an image according to an inkjet system and a print drum 90.

The droplet ejection mechanism 13 includes a droplet ejection head 21Y, a droplet ejection head 21M, a droplet ejection head 21C, and a droplet ejection head 21K that form droplet images by using ink droplets of respective colors, which are an example of black (K), yellow (Y), magenta (M), and cyan (C) droplets.

The droplet ejection heads 21Y, 21M, 21C, and 21K are arranged so that ejection surfaces 23Y, 23M, 23C, and 23K thereof face the print drum 90. The droplet ejection heads 21Y, 21M, 21C, and 21K are supplied with ink of the respective colors from ink tanks (not illustrated).

In the present exemplary embodiment, yellow (Y), magenta (M), cyan (C), and black (K) are basic colors for outputting a color image. In the following description, the droplet ejection heads 21Y, 21M, 21C, and 21K are referred to as droplet ejection heads 21 without Y, M, C, and K in a case where the colors need not be distinguished.

The droplet ejection heads 21Y, 21M, 21C, and 21K for the respective colors basically have similar structures except for types of used ink. A system for ejecting an ink droplet in the droplet ejection heads 21 is not limited in particular. For example, a thermal system, a piezoelectric system, or the like can be used as the system for ejecting an ink droplet.

The droplet ejection heads 21Y, 21M, 21C, and 21K are full line heads each having a length corresponding to a width of an image recording region of a sheet P (see FIG. 1) and having plural nozzles for ink ejection (not illustrated) aligned in the ejection surface 23Y, 23M, 23C, or 23K throughout the entire width of the image recording region. The droplet ejection heads 21 are fixedly provided so as to extend in a direction orthogonal to a direction in which a sheet P (see FIG. 1) is transported.

Although a configuration in which an image is recorded by using ink of the four colors C, M, Y, and K is described as an example in the present exemplary embodiment, this is not restrictive, and colors of ink and a combination thereof may be changed. For example, light-colored ink such as light cyan or light magenta, deep-colored ink, special color ink, and the like may be added as needed. Furthermore, an order in which the heads for the respective colors are arranged is not limited to the one illustrated in FIG. 1.

Ink droplets of the respective colors ejected from the droplet ejection heads 21Y, 21M, 21C, and 21K for the respective colors land on the print drum 90, and thereby a droplet image is formed on the print drum 90. The droplet image formed on the print drum 90 is transferred onto a sheet P transported by a transport cylinder for image formation 39, which will be described later.

Transport Cylinder for Image Formation

Figure 3:
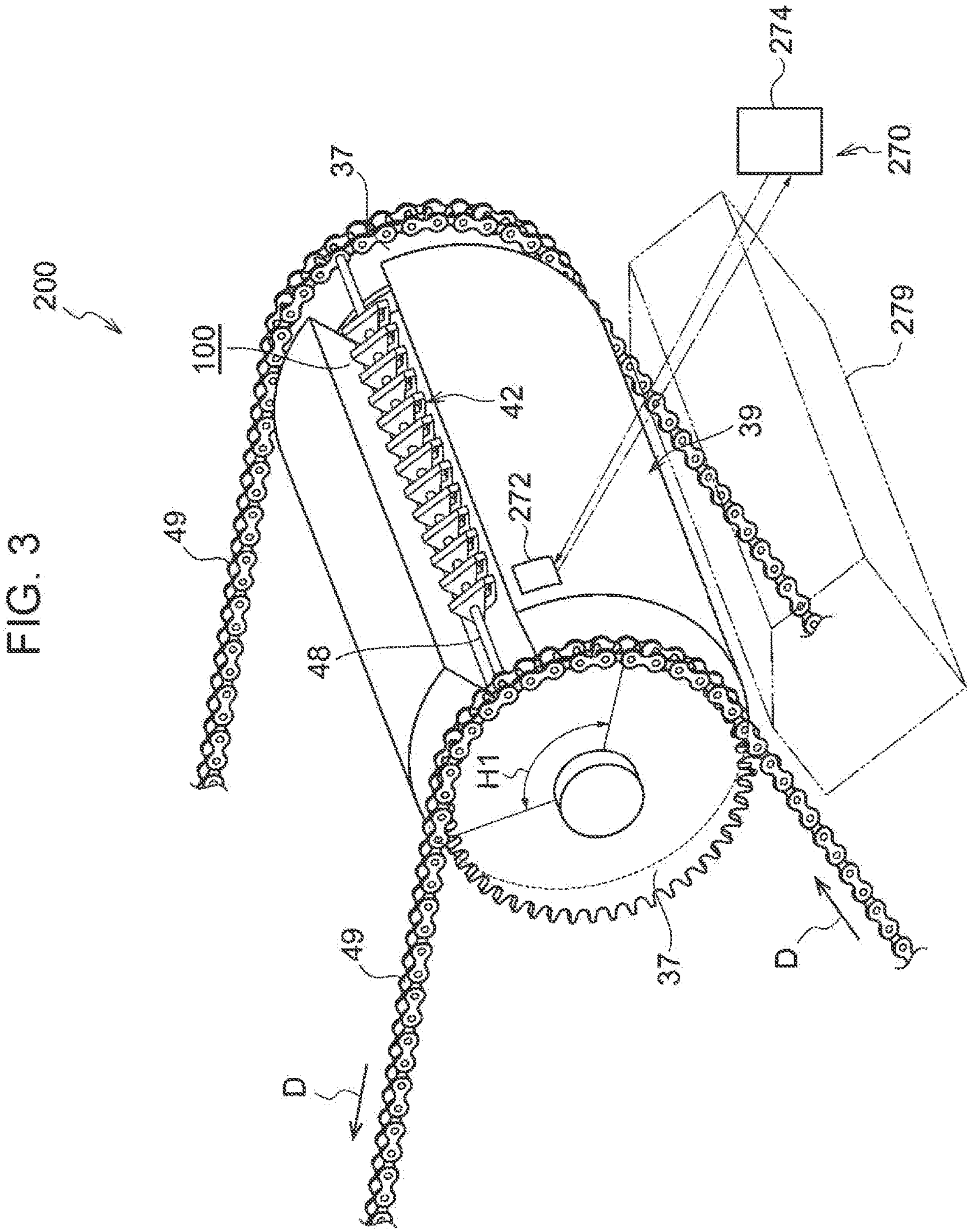
FIG. 3 is a perspective view of a transport cylinder for image formation according to the first exemplary embodiment.

As illustrated in FIGS. 1, 2, and 3, the transport cylinder for image formation 39 has a cylindrical shape having an axial direction in the depth direction of the image forming apparatus 10 and is rotatable in a circumferential direction. Note that the transport cylinder for image formation 39 has, on an outer circumference thereof, a recessed part 100 (see FIG. 3) in which a gripper 42 (see FIG. 3), which will be described later, is stored. In the recessed part 100, plural clips 44 that grip a front end portion P1 (see FIG. 1) of a sheet P on a downstream side are provided in the axial direction (see FIG. 3).

Furthermore, the transport cylinder for image formation 39 is provided, at both end portions thereof in the axial direction, with sprockets 37 around which chains 49, which will be described later, are suspended.

Figure 8:
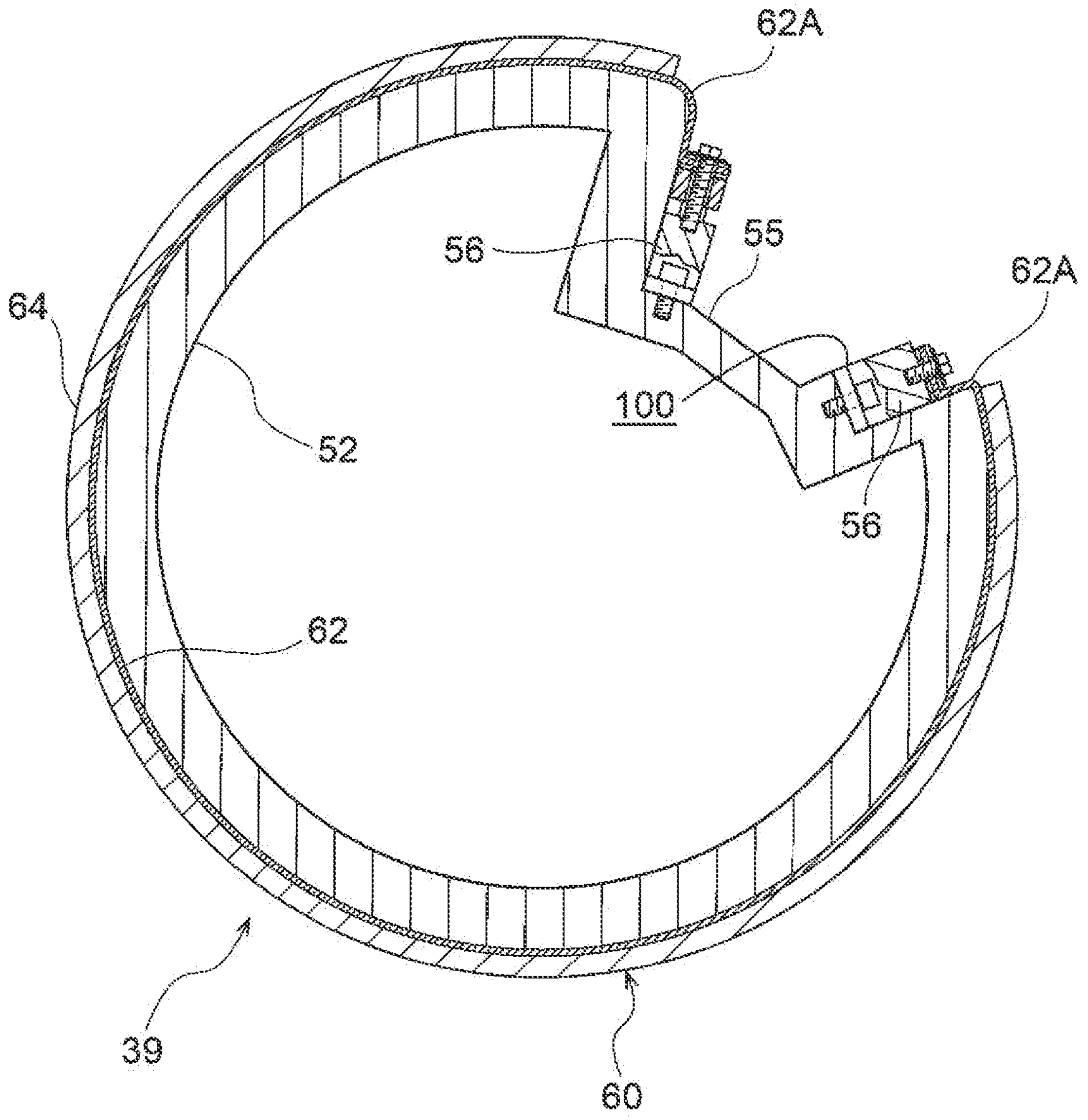
FIG. 8 is a cross-sectional view of a transport cylinder for image formation according to the first exemplary embodiment.

As illustrated in FIG. 8, the transport cylinder for image formation 39 has a cylinder body 52 and a sheet-shaped jacket member 60 wound around the cylinder body 52. The cylinder body 52 has a substantially cylindrical shape having, in a part of the outer circumferential surface thereof, the recessed part 100 provided along the axial direction.

The jacket member 60 has a base layer 62 that is wound around the cylinder body 52 without adhering to the cylinder body 52 and a surface layer 64 that is adhesively wound around an outer circumferential surface of the base layer 62. A cylinder side block 56 is provided on an end portion of a bottom wall 55 in a circumferential direction in the recessed part 100. An end portion 62A of the base layer 62 of the jacket member 60 is fastened to the cylinder side block 56 by using a bolt, and thereby the jacket member 60 is detachably attached to the cylinder body 52. In other words, the jacket member 60 is exchangeable.

Image Formation Position

A portion where the print drum 90 and the transport cylinder for image formation 39 illustrated in FIGS. 1 and 2 are pressed against each other is an image formation position 18.

Drying Device

Figure 4:
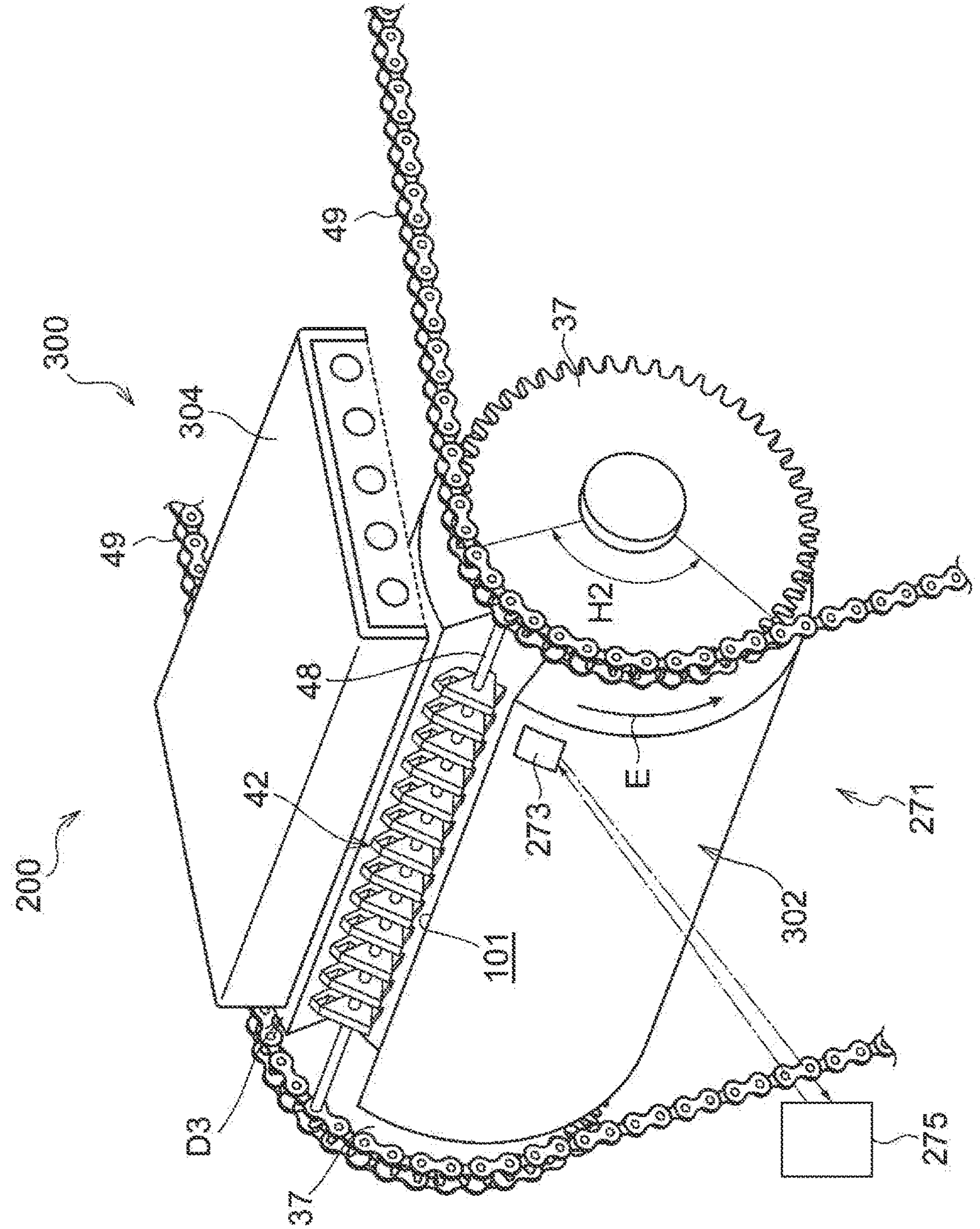
FIG. 4 is a perspective view of a transport cylinder for drying and a drying device according to the first exemplary embodiment.

A drying device 300 illustrated in FIG. 1 is disposed on a downstream side relative to the image formation position 18 in the direction in which a sheet P is transported. As illustrated in FIGS. 1 and 4, the drying device 300 includes a transport cylinder for drying 302 and a heater part 304 that faces the transport cylinder for drying 302. The transport cylinder for drying 302 and the heater part 304 are disposed so as to face each other with a sheet transport path A (described later) interposed therebetween. That is, a sheet P to be dried is transported so as to pass between the transport cylinder for drying 302 and the heater part 304.

As illustrated in FIG. 4, the transport cylinder for drying 302 has a cylindrical shape having an axial direction in the depth direction of the image forming apparatus 10 and is rotatable in a circumferential direction. Note that the transport cylinder for drying 302 has, on an outer circumference thereof, a recessed part 101 in which a gripper 42 (see FIG. 3), which will be described later, is stored. Furthermore, the transport cylinder for drying 302 is provided, at both end portions thereof in the axial direction, with sprockets 37 around which the chains 49, which will be described later, are suspended.

The transport cylinder for drying 302 also includes a cylinder body (not illustrated) and a sheet-shaped jacket member wound around the cylinder body, as with the transport cylinder for image formation 39 (see FIG. 8). The cylinder body has the recessed part 101, and a cylinder side block is provided in the recessed part 101. An end portion of a base layer of the jacket member is fastened to the cylinder side block by using a bolt, and thereby the jacket member is detachably attached to the cylinder body.

Sheet Transport Path

As illustrated in FIG. 1, the sheet transport path A, which is an example of a transport path, has a function of transporting a sheet P fed from a sheet tray 38. A sheet P fed from the sheet tray 38 is transported through the sheet transport path A. Then, the sheet P passes the image formation position 18 and the drying device 300 and is then discharged to a sheet discharge tray 390.

More specifically, the sheet transport path A is configured to sequentially pass the unit 10A and the unit 10B. Accordingly, a sheet P fed from the sheet tray 38 disposed in the unit 10A is transported through the sheet transport path A so as to pass the unit 10B and is then discharged.

Basic Image Formation Operation

Next, an outline of basic image formation operation on a sheet P in the image forming apparatus 10 is described.

Figure 10:
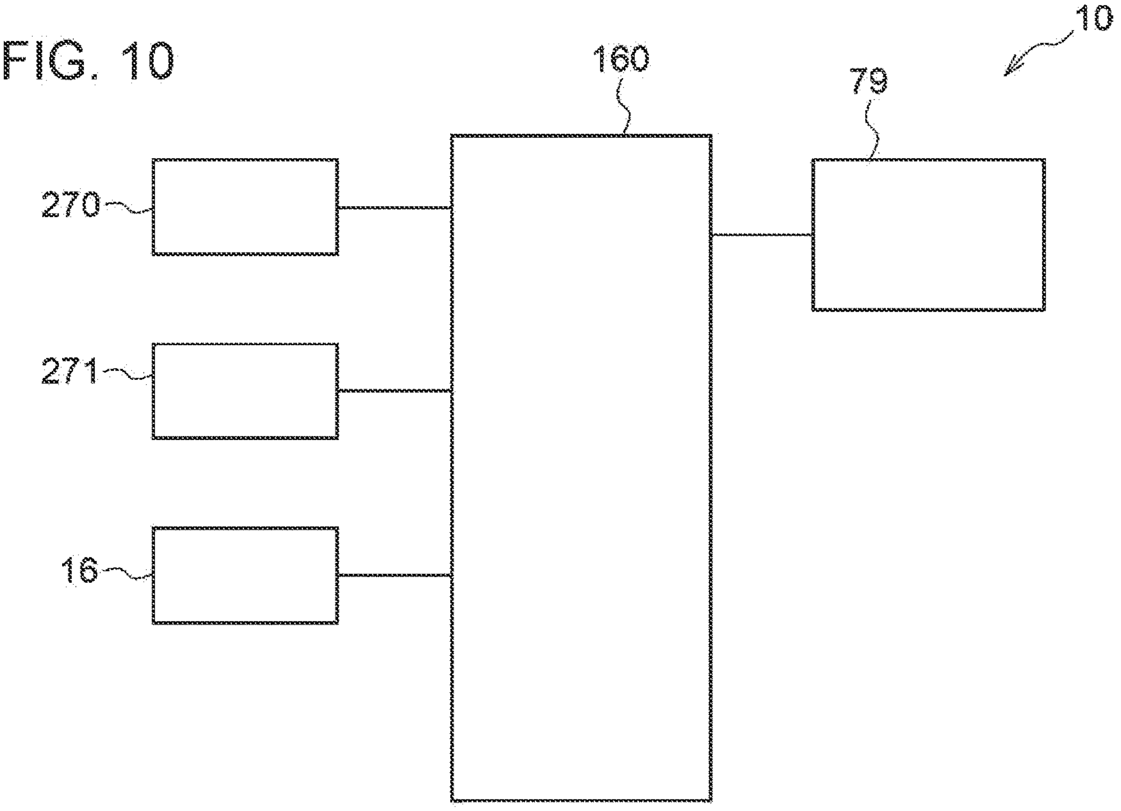
FIG. 10 is a block diagram of a substantial part of the image forming apparatus.

Various operations in the image forming apparatus 10 are performed by a controller 160 built in the apparatus (also see FIG. 10). Upon receipt of an image formation command from an outside, the controller 160 causes members such as the droplet ejection mechanism 13 of the droplet image forming part 11 to operate. Furthermore, the controller 160 sends image data that has been subjected to image processing in an image signal processing part (not illustrated) to the droplet image forming part 11. Then, a droplet image formed on the print drum 90 by the droplet ejection heads 21 for the respective colors at the image formation position 18 is transferred from the print drum 90 onto a sheet P transported by the transport cylinder for image formation 39 at the image formation position 18.

The sheet P on which the droplet image has been transferred is transported toward the drying device 300. In the drying device 300, the droplet image on the sheet P is dried.

Gripper

Figure 5:
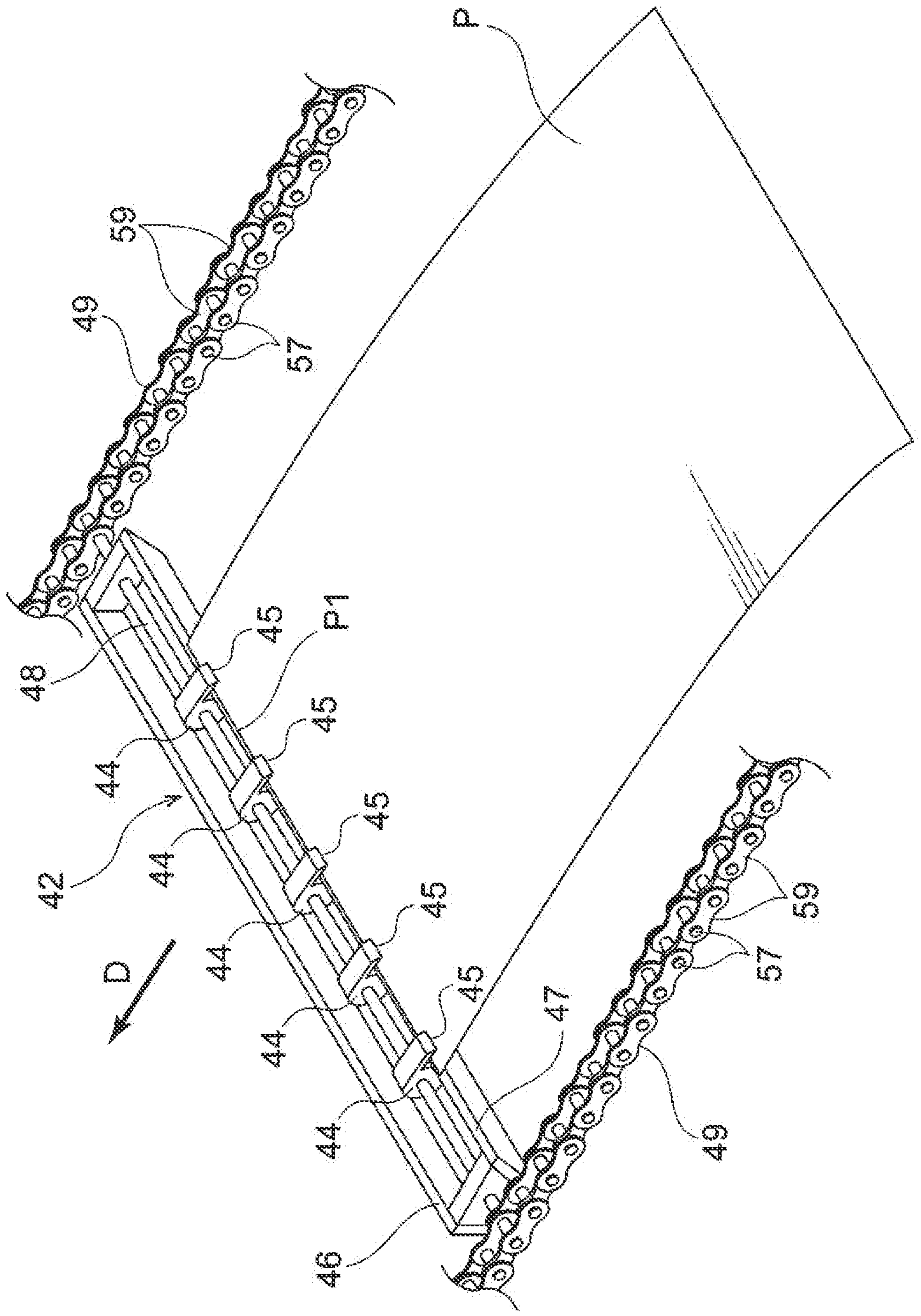
FIG. 5 is an enlarged view illustrating a state where a sheet is held by a gripper.
Figure 6B:
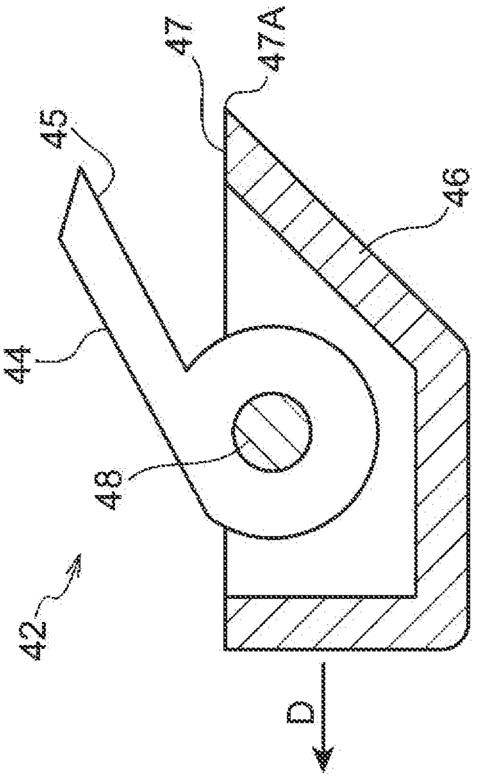
FIGS. 6A and 6B are cross-sectional views illustrating operation of the gripper.
Figure 6A:
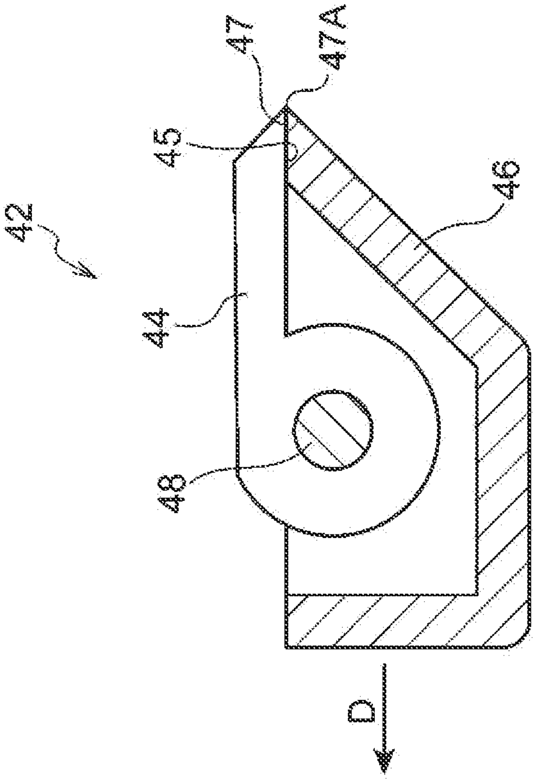

As illustrated in FIGS. 5 and 6, the image forming apparatus 10 includes the gripper 42 as an example of a holding member that holds a front end portion P1 (see FIG. 5) of a transported sheet P and assists transport of the sheet P.

The gripper 42 includes the clips 44, a rectangular case 46 that covers the clips 44, and a shaft 48 extending in the depth direction. The plural clips 44 are provided throughout the depth direction of the apparatus (see FIG. 5). The clips 44 are fixed to the shaft 48 and are configured to be capable of rotating as the shaft 48 rotates in a circumferential direction.

The case 46 has a longitudinal direction in the depth direction and is held by the shaft 48. The case 46 is configured to rotate independently of rotation of the clips 44. Furthermore, the case 46 is configured to cover two sides, specifically, an upstream side and a downstream side in the sheet transport direction and a rear surface side of the sheet P relative to the clips 44. Note that the "rear surface" refers to a non-image-formation surface of the sheet P. In such a structure, front end portions 45 of the clips 44 and a fixing claw part 47 at a rear end of the case 46 are configured to be capable of holding a front end portion P1 of a sheet P in the transport direction. Note that the fixing claw part 47 has a front end portion 47A (see FIGS. 6A and 6B).

Chains

As illustrated in FIG. 5, both end portions of the shaft 48 in the depth direction are held by the chains 49 for transport, which are an example of a circulating member. When the chains 49 circulate, the shaft 48 fixed to the chains 49 also circulates. Accordingly, the gripper 42 circulates along a predetermined circulating path D (see FIG. 1) while being held by the chains 49 provided on the near side and the far side of the image forming apparatus 10.

As illustrated in FIG. 2, the chains 49 are suspended around the sprockets 37 provided at both end portions, in the axial direction, of each of the transport cylinder for image formation 39 (see FIG. 3), the transport cylinder for drying 302 (see FIG. 4), and a transport body 371, which will be described later, and circulate along the circulating path D due to these sprockets 37. Note that outer circumferences of the sprockets 37 are set on an outer side in a radial direction relative to bottoms of the recessed parts 100 and 101.

The chains 49 suspended around the transport cylinder for image formation 39 (see FIG. 3), the transport cylinder for drying 302 (see FIG. 4), the sprockets 37 (see FIG. 5 and other drawings), and the like are driven to circulate by a driving mechanism 79 (see FIG. 10).

Circulating Path D

As illustrated in FIG. 1, the circulating path D partially overlaps the sheet transport path A in front view of the image forming apparatus 10. Specifically, the circulating path D is configured to overlap the sheet transport path A from a contact point between the sheet transport path A and an outer circumference of the transport body 371 provided below the transport cylinder for image formation 39 and provided with the sprockets 37 at both axial end portions thereof to a receiving position D2, which will be described later.

Figure 7A:
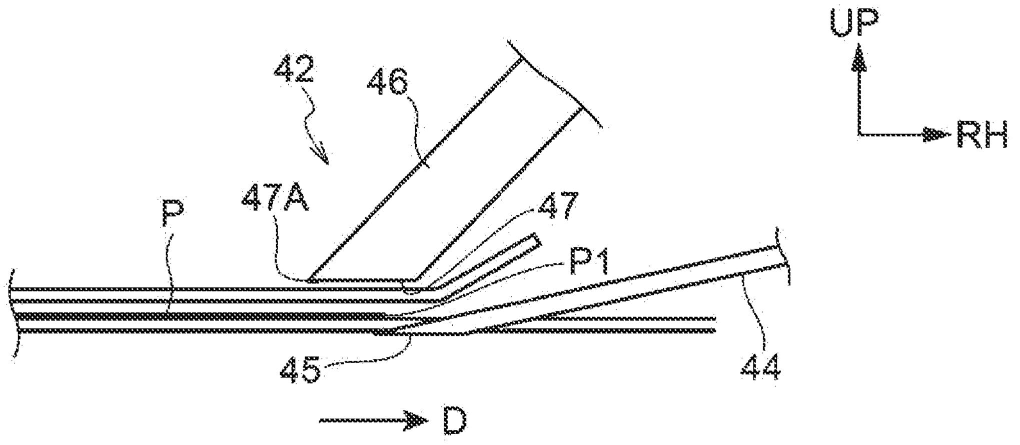
FIGS. 7A to 7C are enlarged views illustrating how the gripper holds a front end of a sheet.

The gripper 42 is configured such that the front end portions 45 of the clips 44 and the fixing claw part 47 of the case 46 come close to each other and hold a front end portion P1 of a sheet P at a start point of the overlap between the sheet transport path A and the circulating path D (see FIGS. 7A o 7C). A holding start position at which the gripper 42 starts to hold the sheet P on the circulating path D is a delivering position D1 at which the sheet P is delivered from the sheet transport path A to the gripper 42.

At an end point of the overlap between the circulating path D and the sheet transport path A, the front end portions 45 of the clips 44 and the fixing claw part 47 of the case 46 are separated from each other, and the front end portion P1 of the sheet P is released. A position at which the sheet P is released from the gripper 42 on the circulating path D is a receiving position D2 at which the sheet P is received from the gripper 42 to the sheet transport path A. Note that the delivering position D1 is disposed on a lower side relative to the receiving position D2.

As illustrated in FIG. 1, in the present exemplary embodiment, the sheet P is delivered from a left side to a right side with respect to the image formation position when the sheet P is delivered from the sheet transport path A to the circulating path D. In other words, a sheet feeding direction at the delivering position D1 is a direction from the left side to the right side.

Meanwhile, the sheet P is received from the right side to the left side in FIG. 1 when the sheet P is received by the circulating path D. In other words, a sheet discharge direction at the receiving position D2 is a direction from the right side to the left side.

A tension roller 31 for pushing the chains 49 from an outer side toward an inner side of the circulating path D is provided on the circulating path D on a downstream side relative to the receiving position D2 in the transport direction. Since the tension roller 31 applies tension to the chains 49, a position of the gripper 42 on the circulating path is stabilized. Since the tension roller 31 pushes the chains 49 from the outer side toward the inner side of the circulating path D, the circulating path D may be made small as a whole as compared with a configuration where tension is applied from the inner side toward the outer side of the circulating path D.

A part of the circulating path D from the tension roller 31 to a merging point with the sheet transport path A is inclined downward. According to this configuration, a space may be provided between the circulating path D and the sheet transport path A as compared with a configuration in which the circulating path D falls vertically after passing the fixation device 400.

Position Adjustment Part

As illustrated in FIGS. 1 and 2, a position adjustment part 50 is disposed on a merging path provided between a direction changing path B and the delivering position D1 on the sheet transport path A. The position adjustment part 50 includes a registration roller 551, a transport roller (not illustrated), and a passing sensor (not illustrated). These rollers are disposed on an upper side and a lower side of the sheet transport path A. Upon receipt of a signal from the passing sensor (not illustrated), the controller 160 (also see FIG. 10) controls operation of the transport roller and the registration roller 551 as appropriate.

Specifically, when a front end portion P1 (see FIG. 5) of a sheet P reaches the registration roller 551, transport of the sheet P stops once and is then fed to the delivering position D1 by driving the registration roller 551 to rotate at a preset timing.

Delivering of Sheet

Figure 7B:
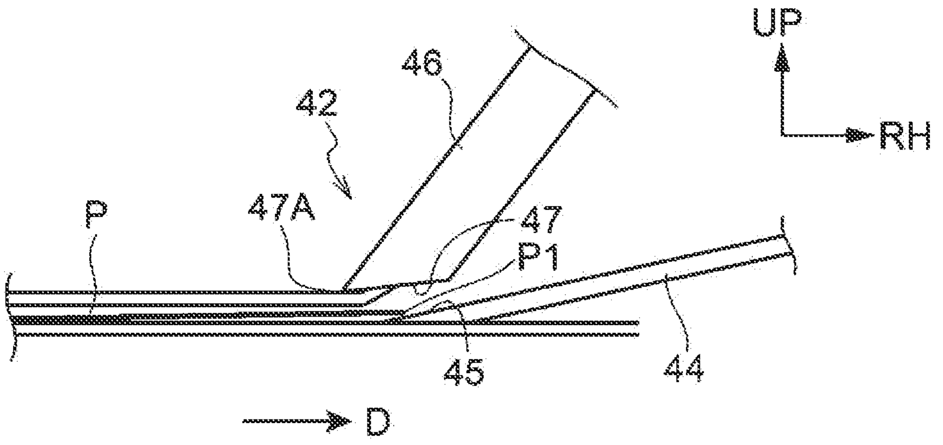
Figure 7C:
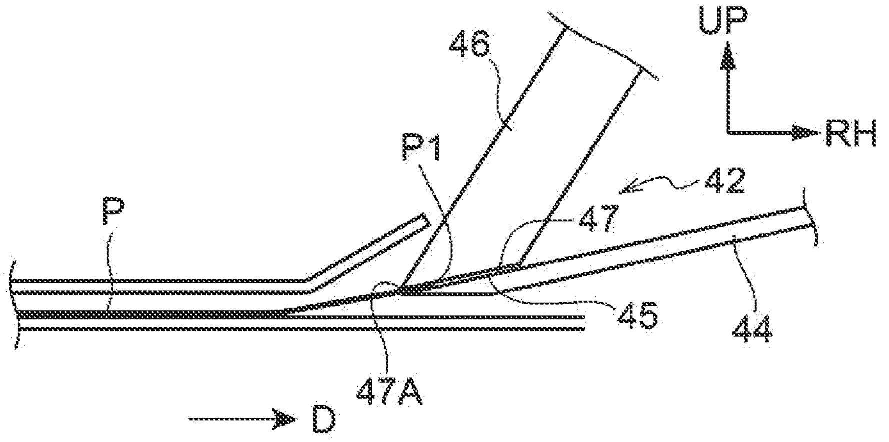

As illustrated in FIGS. 7A to 7C, the sheet P that has passed the position adjustment part 50 (see FIG. 2) is held on a lower circumference of the transport body 371 in FIG. 2 between the fixing claw part 47 of the case 46 and the front end portions 45 of the clips 44 in the gripper 42. The gripper 42 is fed along the circulating path D in synchronization with a transport timing of the front end portion P1 of the sheet P.

At this timing, the case 46 and the clips 44 are opened, as illustrated in FIG. 7A.

Next, the gripper 42 is configured so that the case 46 and the clips 44 gradually approach each other while moving along the circulating path D in synchronization with the transport timing of the sheet P, as illustrated in FIG. 7B. Then, the front end portions 45 of the clips 44 lift the front end portion P1 of the sheet P up from the sheet transport path A.

Then, the front end portion P1 of the sheet P is further lifted up by the clips 44, and is delivered from the sheet transport path A to the circulating path D while being held between the fixing claw part 47 of the case 46 and the front end portions 45 of the clips 44, as illustrated in FIG. 7C. Then, the sheet P is transported along the circulating path D by the gripper 42.

Note that a position at which the sheet P is delivered from the sheet transport path A to the circulating path D is the delivering position D1.

Reversal of Sheet

After the sheet P is delivered to the circulating path D, front and rear sides of the sheet P are reversed along an outer circumference of the transport cylinder for image formation 39, as illustrated in FIG. 1. Then, the sheet P is transported to the image formation position 18 provided on the outer circumference of the transport cylinder for image formation 39.

A surface of the sheet P that faces a backup roller 33 when the sheet P passes the image formation position 18 is an image formation surface and is a front surface. In other words, at the position adjustment part 50 and the delivering position D1, the sheet P is transported while a rear surface thereof, which is a non-image-formation surface, is facing upward.

Receipt of Sheet

The sheet P is received from the circulating path D to the sheet transport path A. A branching point between the circulating path D and the sheet transport path A is the receiving position D2. At the receiving position D2, the gripper 42 holding the front end portion P1 (see FIG. 3) of the sheet P is opened, and thereby the sheet P is received from the circulating path D to the sheet transport path A.

Configuration of Substantial Part

Next, a configuration of a substantial part according to the present exemplary embodiment is described.

Transport Unit

As illustrated in FIG. 2, a transport unit 200 includes the chains 49, the transport cylinder for image formation 39, the transport cylinder for drying 302, and the drying device 300. A driving force transmission mechanism part 279 is an example of a peripheral member around the transport cylinder for image formation 39.

As illustrated in FIG. 9, the transport unit 200 is slidable in the depth direction. Maintenance work of members such as the transport cylinder for image formation 39 and the transport cylinder for drying 302 is performed in a state where the transport unit 200 has been drawn out to the near side of the apparatus.

Note that the reference sign 202 in FIG. 9 represents a transport unit according to a second exemplary embodiment, which will be described later.

Maintenance Position

Next, maintenance positions of the recessed parts 100 and 101 (see FIG. 3 or 4) during maintenance of the transport cylinder for image formation 39 (see FIG. 3) and the transport cylinder for drying 302 (see FIG. 4) are described.

Note that maintenance of the transport cylinder for image formation 39 (see FIG. 3) and the transport cylinder for drying 302 (see FIG. 4) in the present exemplary embodiment is, for example, exchange of the jacket member 60 (see FIG. 8) but is not limited to this.

The maintenance positions are positions where a worker who performs maintenance can access the recessed parts 100 and 101. The maintenance positions are desirably positions where a worker who performs maintenance can easily access the recessed parts 100 and 101.

As described above, maintenance of the transport cylinder for image formation 39 (see FIG. 3) and the transport cylinder for drying 302 (see FIG. 4) is performed in a state where the transport unit 200 has been drawn out to the near side, as illustrated in FIG. 9.

Maintenance Position of Transport Cylinder for Image Formation

A maintenance position of the recessed part 100 of the transport cylinder for image formation 39 illustrated in FIG. 3 is within a range H1. Specifically, the range H1 of the maintenance position is within a range in which the chains 49 are suspended around the transport cylinder for image formation 39 and within a range in which the driving force transmission mechanism part 279 is not provided. Note that in the present exemplary embodiment, the range in which the chains 49 are suspended around the transport cylinder for image formation 39 and the range in which the driving force transmission mechanism part 279 is not provided partially overlap.

From another perspective, the range H1 is within an angle in which the chains 49 are suspended around the transport cylinder for image formation 39 and within an angle in which the driving force transmission mechanism part 279 is not provided.

Note that the maintenance position of the recessed part 100 of the transport cylinder for image formation 39 according to the present exemplary embodiment is a position of 2 o'clock in front view, specifically, the position illustrated in FIG. 3.

Maintenance Position of Transport Cylinder for Drying

A maintenance position of the recessed part 101 of the transport cylinder for drying 302 illustrated in FIG. 4 is within a range H2. Specifically, the range H2 of the maintenance position is within a range in which the chains 49 are suspended around the transport cylinder for drying 302 and within a range in which the heater part 304 is not provided.

In the present exemplary embodiment, the range in which the chains 49 are suspended around the transport cylinder for drying 302 and the range in which the heater part 304 is not provided partially overlap.

From another perspective, the range H2 is within an angle in which the chains 49 are suspended around the transport cylinder for drying 302 and within an angle in which the heater part 304 is not provided.

Note that the maintenance position of the recessed part 101 of the transport cylinder for drying 302 according to the present exemplary embodiment is a position of 10 o'clock in front view, specifically, the position illustrated in FIG. 4.

Position Detection Mechanism

A position detection mechanism 270 illustrated in FIG. 3 is a mechanism that detects a rotation position of the transport cylinder for image formation 39. In the present exemplary embodiment, the position detection mechanism 270 has a patch 272 and an optical sensor 274. The patch 272 is attached to an end portion of the transport cylinder for image formation 39 in an axial direction. A position of the patch 272 is read by the optical sensor 274, and thereby a rotation position of the transport cylinder for image formation 39 is detected.

A position detection mechanism 271 illustrated in FIG. 4 is a mechanism that detects a rotation position of the transport cylinder for drying 302. In the present exemplary embodiment, the position detection mechanism 271 has a patch 273 and an optical sensor 275. The patch 273 is attached to an end portion of the transport cylinder for drying 302 in an axial direction. A position of the patch 273 is read by the optical sensor 275, and thereby a rotation position of the transport cylinder for drying 302 is detected.

In the present exemplary embodiment, the position detection mechanisms 270 and 271 are for stopping the recessed part 100 of the transport cylinder for image formation 39 and the recessed part 101 of the transport cylinder for drying 302 at the maintenance positions.

Operation Panel

As illustrated in FIGS. 1 and 2, the image forming apparatus 10 has an operation panel 16. A worker causes a maintenance target selection screen to be displayed by operating the operation panel 16, for example, when performing maintenance and selects a maintenance target member. Specifically, in the present exemplary embodiment, the worker selects the transport cylinder for image formation 39 or the transport cylinder for drying 302 as the maintenance target.

Controller

The controller 160 (see FIG. 1) illustrated in FIG. 10 has a function of controlling the whole image forming apparatus 10. A hardware configuration of the controller 160 is a computer including a central processing unit (CPU), a read only memory (ROM) in which programs and the like for realizing processing routines are stored, a random access memory (RAM) in which data are temporarily stored, a hard disk drive (HDD) serving as a storage unit, and a network interface, each of which is not illustrated.

The controller 160 is electrically connected to the position detection mechanisms 270 and 271, the operation panel 16, and the driving mechanism 79 having a driving function and a stopping function. Rotary driving and stoppage of the driving mechanism 79 are controlled by the controller 160. In a case where the worker selects the transport cylinder for image formation 39 as the maintenance target on the operation panel 16, the controller 160 controls the driving mechanism 79 so that the recessed part 100 of the transport cylinder for image formation 39 is located at the maintenance position illustrated in FIG. 3 within the range H1. Similarly, in a case where the worker selects the transport cylinder for drying 302 as the maintenance target on the operation panel 16, the controller 160 controls the driving mechanism 79 so that the recessed part 101 of the transport cylinder for drying 302 is located at the maintenance position illustrated in FIG. 4 within the range H2.

From another perspective, in a case where the worker selects the transport cylinder for image formation 39 as the maintenance target on the operation panel 16, the controller 160 controls the driving mechanism 79 so that the recessed part 100 of the transport cylinder for image formation 39 stops at the maintenance position illustrated in FIG. 3. Similarly, in a case where the worker selects the transport cylinder for drying 302 as the maintenance target on the operation panel 16, the controller 160 controls the driving mechanism 79 so that the recessed part 101 of the transport cylinder for drying 302 stops at the maintenance position illustrated in FIG. 4.

Operation

Next, operation of the present exemplary embodiment is described.

In a case where the worker selects the transport cylinder for image formation 39 as the maintenance target on the operation panel 16, the controller 160 controls the driving mechanism 79 so that the recessed part 100 of the transport cylinder for image formation 39 is located at the maintenance position illustrated in FIG. 3 within the range H1, and in a case where the worker selects the transport cylinder for drying 302 as the maintenance target, the controller 160 controls the driving mechanism 79 so that the recessed part 101 of the transport cylinder for drying 302 is located at the maintenance position illustrated in FIG. 4 within the range H2.

Therefore, an amount of work for stopping the recessed part 100 or 101 at the maintenance position may be reduced as compared with a case where the worker stops the recessed part 100 or 101 at the maintenance position by inching the transport cylinder for image formation 39 or the transport cylinder for drying 302 selected as a maintenance target.

The case of "stopping a recessed part at a maintenance position by inching" is described below.

The worker slightly drives the driving mechanism 79 by operating a switch, a button, a lever, and the like to rotate the transport cylinder for image formation 39 or the transport cylinder for drying 302 by a small amount and then stop. The worker causes the recessed part 100 or 101 to be located at the maintenance position while visually checking the position of the recessed part 100 or 101 by repeating this work.

Since the maintenance position of the recessed part 100 of the transport cylinder for image formation 39 and the maintenance position of the recessed part 101 of the transport cylinder for drying 302 are within the range in which the chains 49 are suspended, the worker may easily access the recessed parts 100 and 101 as compared with a case where the maintenance positions of the recessed parts 100 and 101 are located outside the range in which the chains 49 are suspended.

In a case where the recessed parts 100 and 101 are located outside the range in which the chains 49 are suspended, maintenance of the recessed parts 100 and 101 needs to be performed from a space between the upper and lower parts of the chains 49, and therefore access to the recessed parts 100 and 101 is not easy. Therefore, by setting the maintenance positions of the recessed parts 100 and 101 within the range in which the chains 49 are suspended, the recessed parts 100 and 101 may be easily accessed.

Furthermore, since the maintenance positions of the recessed parts 100 and 101 are located within the range in which the chains 49 are suspended and outside the range in which the driving force transmission mechanism part 279 or the heater part 304 is disposed, the recessed parts 100 and 101 may be easily accessed as compared with a case where the maintenance positions of the recessed parts 100 and 101 are located outside the range in which the chains 49 are suspended and within the range in which the driving force transmission mechanism part 279 or the heater part 304 is disposed.

Second Exemplary Embodiment

Next, an image forming apparatus according to a second exemplary embodiment is described. Note that members identical to those in the first exemplary embodiment are given identical reference signs, and repeated description thereof is omitted. The second exemplary embodiment is different from the first exemplary embodiment only in a unit and therefore only the unit 10A is illustrated and described.

Figure 11:
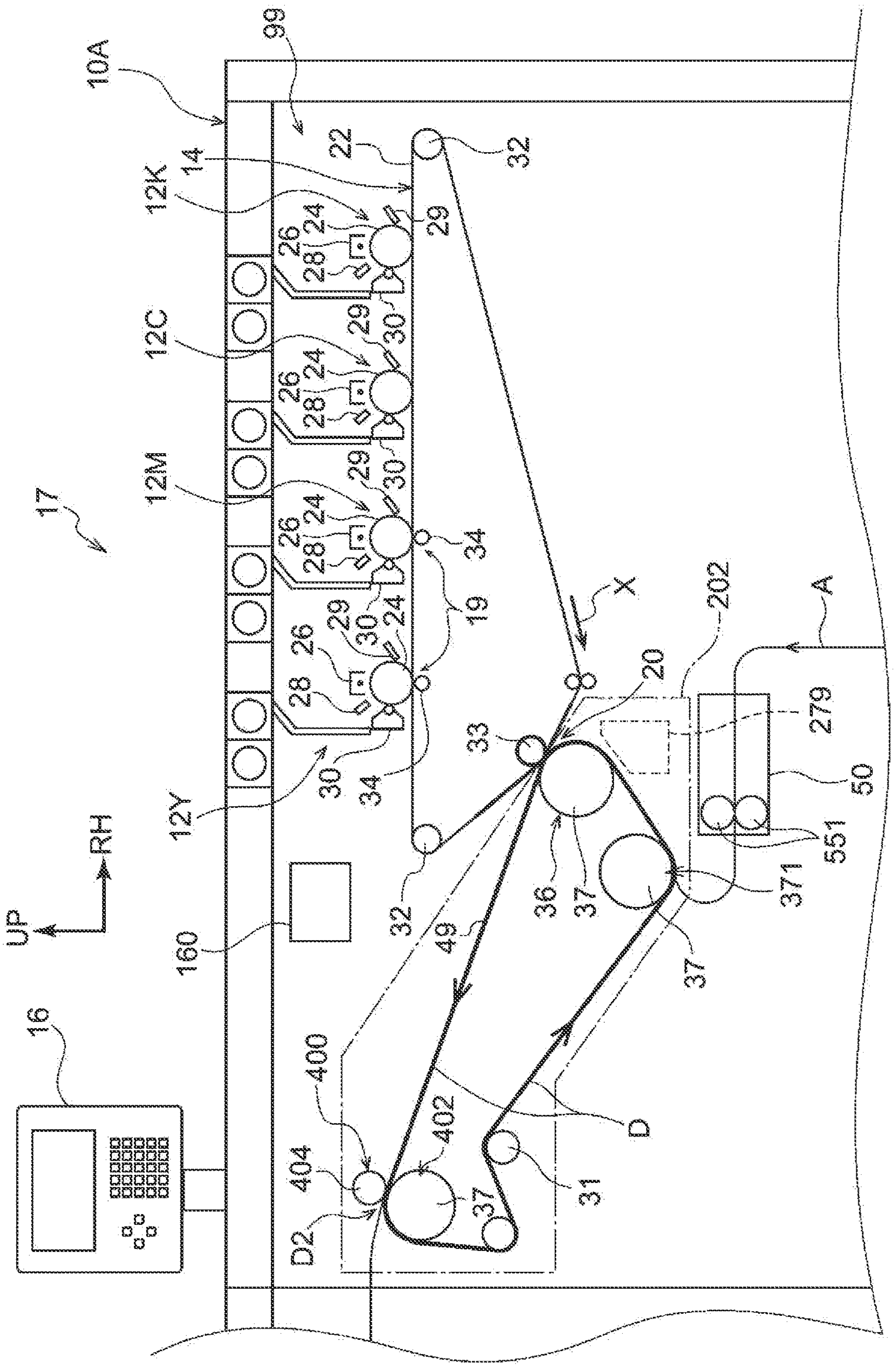
FIG. 11 is a front view of an image forming part of an image forming apparatus according to a second exemplary embodiment.

A developer image forming part 99 of an image forming apparatus 17 according to the second exemp0lary embodiment illustrated in FIG. 11 includes image formation units 12 for forming an image according to an electrophotographic system, an intermediate transfer belt 22 for holding a formed image, and an intermediate transfer unit 14 equipped with the intermediate transfer belt 22 and supporting the intermediate transfer belt 22. The image forming apparatus 17 includes, on a lower left side of the intermediate transfer unit 14, a transfer cylinder 36 for transferring an image from the intermediate transfer unit 14 onto a sheet P for image recording.

A contact part between the intermediate transfer belt 22 and the transfer cylinder 36 is a second transfer position 20, which is an example of an image formation position, and at this second transfer position 20, developer images formed by the image formation units 12 are transferred onto a surface of a sheet P with the intermediate transfer belt 22 attached to the intermediate transfer unit 14 interposed therebetween.

The developer image forming part 99 includes the plural image formation units 12 for forming toner layers of respective colors. In the present exemplary embodiment, the developer image forming part 99 includes four image formation units 12 in total corresponding to respective colors, specifically, a yellow image formation unit 12Y, a magenta image formation unit 12M, a cyan image formation unit 12C, and a black image formation unit 12K.

Note that yellow (Y), magenta (M), cyan (C), and black (K) are basic colors for outputting a color image. Hereinafter, in a case where colors of the image formation units 12 need not be distinguished, the yellow image formation unit 12Y, the magenta image formation unit 12M, the cyan image formation unit 12C, and the black image formation unit 12K are simply referred to as "image formation units 12" without the signs Y, M, C, and K denoting the respective colors as appropriate.

The image formation units 12 for the respective colors basically have similar configurations except for types of used toner. Each of the image formation units 12 includes a cylindrical photoreceptor 24 that rotates and a charging unit 26 that charges the photoreceptor 24. Furthermore, each of the image formation units 12 includes an exposure device 28 that forms an electrostatic latent image by irradiating the charged photoreceptor 24 with light for exposure and a developing device 30 for developing the electrostatic latent image as an image formed by a toner layer by using a developer containing toner. Furthermore, each of the image formation units 12 includes a cleaner 29 that removes toner remaining on a surface of the photoreceptor 24 after toner is transferred from the photoreceptor 24 to the intermediate transfer belt 22.

The photoreceptors 24 of the respective colors are configured to be capable of making contact with an outer circumferential surface of the intermediate transfer belt 22. The image formation units 12 corresponding to yellow, magenta, cyan, and black are arranged from an upstream side to a downstream side in a direction in which the intermediate transfer belt 22 circulates.

Although a configuration in which an image is recorded by using toner of four colors C, M, Y, and K is described as an example in the present exemplary embodiment, this is not restrictive, colors of ink and a combination thereof may be changed. For example, light-colored ink such as light cyan or light magenta, deep-colored ink, special color ink, and the like may be added as needed. Furthermore, an order in which the image formation units 12 for the respective colors are arranged is not limited to the one illustrated in FIG. 11.

Intermediate Transfer Unit

The intermediate transfer unit 14 includes first transfer rollers 34 disposed so as to face the image formation units 12 for the respective colors and a backup roller 33 disposed so as to face the transfer cylinder 36.

Intermediate Transfer Belt

The intermediate transfer belt 22 is an endless belt. The intermediate transfer belt 22 is suspended around plural rollers 32, and thereby a posture thereof is decided. In the present exemplary embodiment, the posture of the intermediate transfer belt 22 is a substantially obtuse triangular shape that is long in an apparatus width direction in front view and has an obtuse-angled bulging part bulging downward. One (not illustrated) of the plural rollers 32 has a function of rotating the intermediate transfer belt 22 in a direction indicated by arrow X by force of a motor (not illustrated). The intermediate transfer belt 22 transports a first-transferred image to the second transfer position 20 by rotating in the direction indicated by arrow X.

The intermediate transfer belt 22 is configured to be capable of circulating in the direction indicated by arrow X while being in contact with the photoreceptors 24 of the respective colors or being separated from the photoreceptors 24 of the respective colors.

First Transfer

Each first transfer part 19 is a part where the photoreceptor 24, the intermediate transfer belt 22, and the first transfer roller 34 make contact with one another. The first transfer roller 34 is disposed so as to face the photoreceptor 24 with the intermediate transfer belt 22 interposed therebetween. The first transfer roller 34 and the intermediate transfer belt 22 are configured to make contact with each other by a predetermined load.

Furthermore, a voltage is applied to the first transfer roller 34 by a power feeding part (not illustrated). This voltage is a first transfer voltage by which a developer image formed on the photoreceptor 24 is first-transferred onto the intermediate transfer belt 22 between the photoreceptor 24 and the first transfer roller 34.

Transfer Cylinder

The transfer cylinder 36 is disposed so as to face the backup roller 33 with the intermediate transfer belt 22 interposed therebetween. The transfer cylinder 36 has a cylindrical shape having an axial direction in a depth direction of the image forming apparatus 10 and is rotatable in a circumferential direction.

A voltage is applied to the transfer cylinder 36 by a power feeding part (not illustrated). This voltage is a second transfer voltage by which developer images transferred onto the intermediate transfer belt 22 in an overlapping manner are second-transferred onto a sheet P transported to the second transfer position 20.

Figure 12:
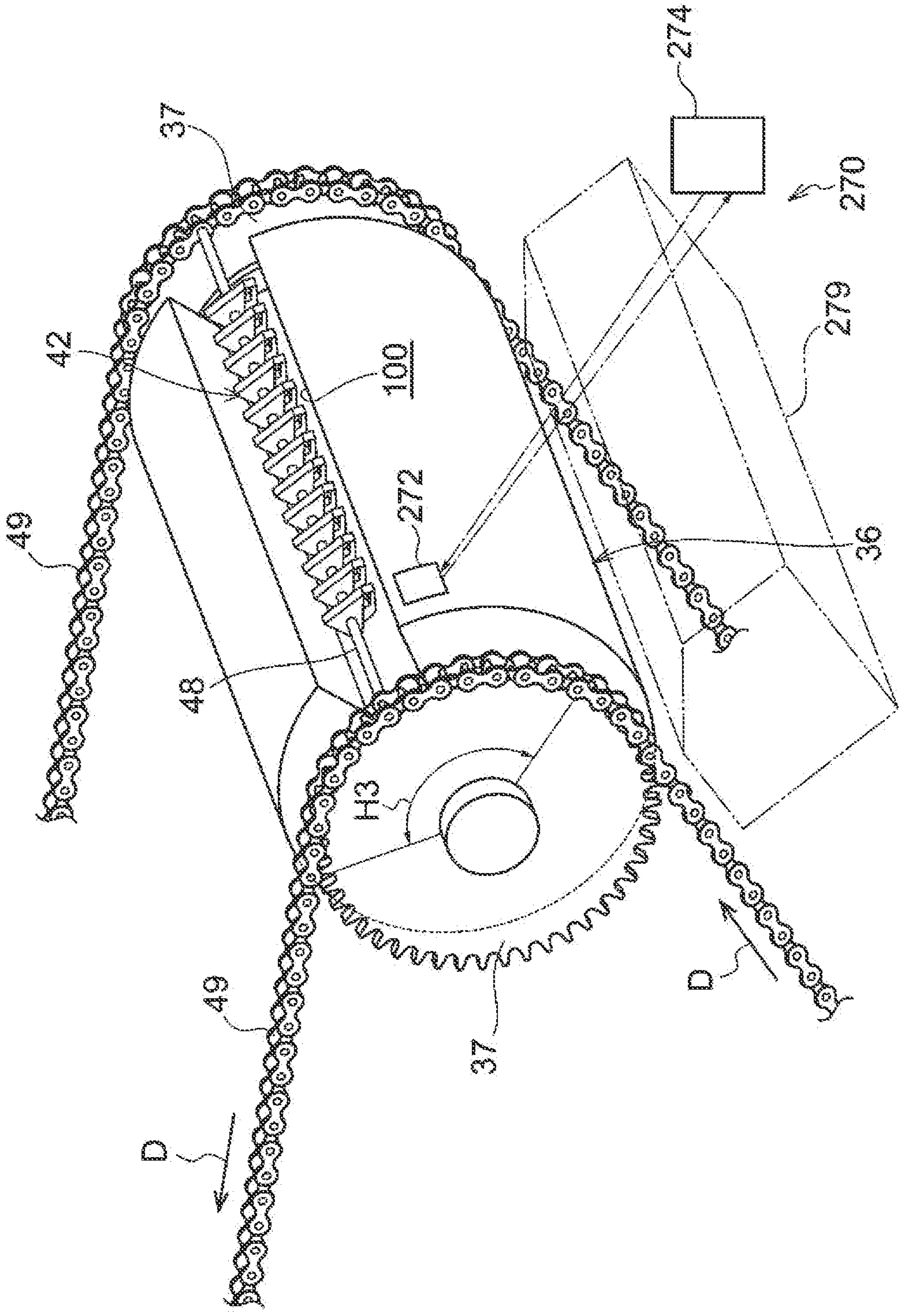
FIG. 12 is a perspective view of a transfer cylinder according to the second exemplary embodiment.

As illustrated in FIG. 12, the transfer cylinder 36 has a cylindrical shape having an axial direction in the depth direction of the image forming apparatus 10 and is rotatable in a circumferential direction. The transfer cylinder 36 has, on an outer circumference thereof, a recessed part 100 in which a gripper 42 is stored. In the recessed part 100, plural clips 44 that grip a front end portion P1 (see FIG. 5) of a sheet P on a downstream side are provided in an axial direction.

Furthermore, the transfer cylinder 36 is provided, at both end portions thereof in the axial direction, with sprockets 37 around which the chains 49 are suspended.

The transfer cylinder 36 also has a cylinder body (not illustrated) and a sheet-shaped jacket member wound around the cylinder body, as with the transport cylinder for image formation 39 (see FIG. 8). The cylinder body has the recessed part 100, and a cylinder side block is provided in the recessed part 100. An end portion of a base layer of the jacket member is fastened to the cylinder side block by using a bolt, and thereby the jacket member is detachably attached to the cylinder body.

Second Transfer

As illustrated in FIG. 11, the second transfer position is a part where the intermediate transfer belt 22 and the transfer cylinder 36 having a roll shape make contact with each other. The intermediate transfer belt 22 is configured to make contact with the transfer cylinder 36 by a predetermined load by the backup roller 33 disposed so as to face the transfer cylinder 36.

Fixation Device

As illustrated in FIG. 11, a fixation device 400 is disposed on a downstream side relative to the second transfer position 20 in a direction in which a sheet P is transported.

Figure 13:
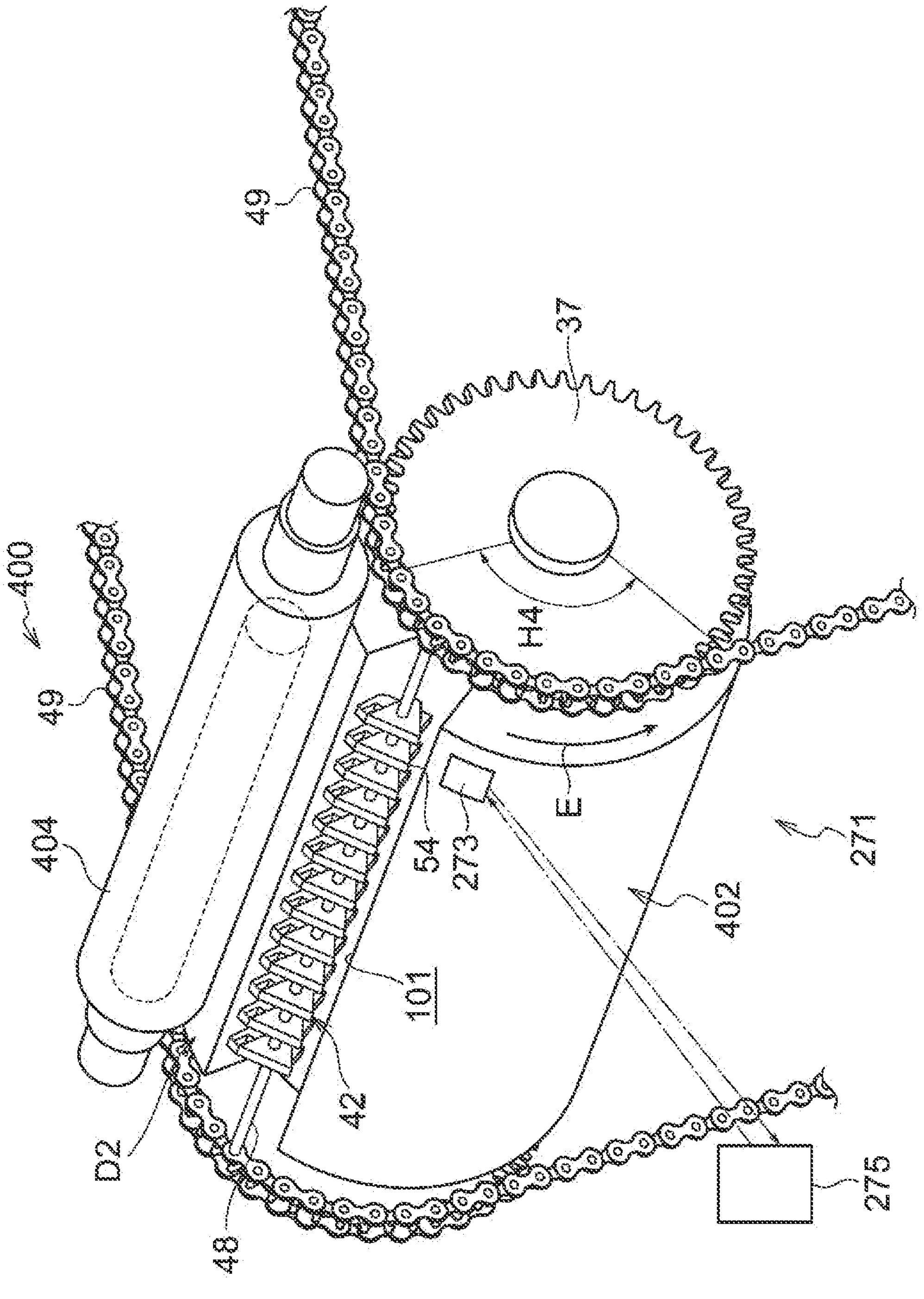
FIG. 13 is a perspective view of a fixation cylinder and a fixation device according to the second exemplary embodiment.

As illustrated in FIGS. 11 and 13, the fixation device 400 includes a pair of rollers that face each other. One of the pair of rollers is a fixation cylinder 402 around which the chains 49 are suspended, and the other one of the pair of rollers is a heating roller 404. The fixation cylinder 402 and the heating roller 404 are provided so as to face each other with a sheet transport path A interposed therebetween. Accordingly, a sheet P on which a developer image is to be fixed is transported so as to pass between the fixation cylinder 402 and the heating roller 404. A developer image transferred onto a sheet P is fixed onto the sheet P when the sheet P passes between the fixation cylinder 402 and the heating roller 404.

As illustrated in FIG. 13, the fixation cylinder 402 has a cylindrical shape having an axial direction in the depth direction of the image forming apparatus 10 and is rotatable in a circumferential direction. The fixation cylinder 402 has, on an outer circumference thereof, a recessed part 101 in which the gripper 42 is stored. In the recessed part 101, the plural clips 44 that grip a front end P1 (see FIG. 5) of a sheet P on a downstream side are provided in the axial direction.

Furthermore, the transfer cylinder 36 and the fixation cylinder 402 are each provided, at both end portions thereof in the axial direction, with sprockets 37 around which the chains 49 are suspended.

The fixation cylinder 402 also has a cylinder body (not illustrated) and a sheet-shaped jacket member wound around the cylinder body, as with the transport cylinder for image formation 39 (see FIG. 8). The cylinder body has the recessed part 101, and a cylinder side block is provided in the recessed part 101. An end portion of a base layer of the jacket member is fastened to the cylinder side block by using a bolt, and thereby the jacket member is detachably attached to the cylinder body.

Basic Image Formation Operation

Next, an outline of basic image formation operation on a sheet P in the developer image forming part 99 illustrated in FIG. 11 is described.

Upon receipt of an image formation command from an outside, a controller 160 causes the image formation units 12 to operate. The photoreceptors 24 of the respective colors are charged by the respective charging units 26 while rotating. The controller 160 sends image data that has been subjected to image processing in an image signal processing part (not illustrated) to the exposure devices 28. The exposure devices 28 expose the charged photoreceptors 24 to light by irradiating the photoreceptors 24 with exposure light according to the image data. This forms electrostatic latent images on outer circumferential surfaces of the photoreceptors 24. The electrostatic latent images formed on the photoreceptors 24 are developed by the developing devices 30, and thus toner images, which are an example of developer images of respective colors, are formed on the photoreceptors 24 corresponding to the respective colors.

The toner images of the respective colors formed on the photoreceptors 24 of the respective colors are first-transferred onto the intermediate transfer belt 22 by the first transfer rollers 34 of the respective colors at the first transfer parts. The toner images of the respective colors are sequentially first-transferred onto the intermediate transfer belt 22 so as to be superimposed on one another since the intermediate transfer belt 22 circulates. The toner images thus superimposed on one another are transported to the second transfer position 20 by circulation of the intermediate transfer belt 22. The superimposed toner images are transferred from the intermediate transfer belt 22 onto a sheet P at the second transfer position 20.

The sheet P onto which the toner images have been second-transferred is transported toward the fixation device 400. In the fixation device 400, the sheet P is heated and pressed by the heating roller 404 and the fixation cylinder 402. In this way, the toner images formed by the image formation units 12 are fixed onto the sheet P.

Configuration of Substantial Part

A configuration of a substantial part according to the present exemplary embodiment is described.

Transport Unit

As illustrated in FIG. 11, the transport unit 202 includes the chains 49, the transfer cylinder 36, the fixation cylinder 402, and the fixation device 400.

As illustrated in FIG. 9, the transport unit 202 is slidable in the depth direction. Maintenance work of members such as the transfer cylinder 36 and the fixation cylinder 402 (see FIG. 11) is performed in a state where the transport unit 202 has been drawn out to a near side.

Maintenance Position

Next, maintenance positions of the recessed parts 100 and 101 (see FIG. 12 or 13) during maintenance of the transfer cylinder 36 (see FIG. 12) and the fixation cylinder 402 (see FIG. 13) are described.

The maintenance of the transfer cylinder 36 (see FIG. 12) and the fixation cylinder 402 (see FIG. 13) in the present exemplary embodiment is, for example, exchange of the jacket member 60 (see FIG. 8). As described above, maintenance of the transfer cylinder 36 (see FIG. 12) and the fixation cylinder 402 (see FIG. 13) is performed in a state where the transport unit 200 has been drawn out to the near side, as illustrated in FIG. 9.

Maintenance Position of Transfer Cylinder

A maintenance position of the recessed part 100 of the transfer cylinder 36 illustrated in FIG. 12 is within a range H3. Specifically, the range H3 of the maintenance position is within a range in which the chains 49 are suspended around the transfer cylinder 36 and within a range in which a driving force transmission mechanism part 279 is not provided. In the present exemplary embodiment, the range in which the chains 49 are suspended around the transfer cylinder 36 and the range in which the driving force transmission mechanism part 279 is not provided partially overlap.

From another perspective, the range H3 is within an angle in which the chains 49 are suspended around the transfer cylinder 36 and within an angle in which the driving force transmission mechanism part 279 is not provided.

Note that the maintenance position of the recessed part 100 of the transfer cylinder 36 according to the present exemplary embodiment is a position of 2 o'clock in front view, specifically, the position illustrated in FIG. 12.

Maintenance Position of Fixation Cylinder

The maintenance position of the recessed part 101 of the fixation cylinder 402 illustrated in FIG. 13 is within a range H4. Specifically, the range H4 of the maintenance position is within a range in which the chains 49 are suspended around the fixation cylinder 402 and within a range in which the heating roller 404 is not provided. Note that in the present exemplary embodiment, the range in which the chains 49 are suspended around the fixation cylinder 402 and the range in which the heating roller 404 is not provided partially overlap.

From another perspective, the range H4 is within an angle in which the chains 49 are suspended around the fixation cylinder 402 and within an angle in which the heating roller 404 is not provided.

Note that the maintenance position of the recessed part 101 of the fixation cylinder 402 according to the present exemplary embodiment is a position of 10 o'clock in front view, specifically, the position illustrated in FIG. 13.

Position Detection Mechanism

Position detection mechanisms 270 and 271 illustrated in FIGS. 12 and 13 are similar to those in the first exemplary embodiment and are mechanisms that detect rotation positions of the transfer cylinder 36 (see FIG. 12) and the fixation cylinder 402 (see FIG. 13). Positions of patches 272 and 273 are read by optical sensors 274 and 275, and thereby rotation positions of the transfer cylinder 36 (see FIG. 12) and the fixation cylinder 402 (see FIG. 13) are detected.

In the present exemplary embodiment, the position detection mechanisms 270 and 271 are for stopping the recessed part 100 of the transfer cylinder 36 and the recessed part 101 of the fixation cylinder 402 so that the recessed part 100 of the transfer cylinder 36 and the recessed part 101 of the fixation cylinder 402 are located in the ranges H3 and H4, which are maintenance positions.

Controller

As in the first exemplary embodiment, in a case where a worker selects the transfer cylinder 36 as a maintenance target on the operation panel 16, the controller 160 illustrated in FIG. 10 controls the driving mechanism 79 so that the recessed part 100 of the transfer cylinder 36 (see FIG. 12) is located at the maintenance position illustrated in FIG. 12 within the range H3. Similarly, in a case where the worker selects the fixation cylinder 402 (see FIG. 13) as a maintenance target on the operation panel 16, the controller 160 controls the driving mechanism 79 so that the recessed part 101 of the fixation cylinder 402 (see FIG. 13) is located at the maintenance position illustrated in FIG. 13 within the range H4.

From another perspective, in a case where the worker selects the transfer cylinder 36 as a maintenance target on the operation panel 16, the controller 160 controls the driving mechanism 79 so that the recessed part 100 of the transfer cylinder 36 stops at the maintenance position illustrated in FIG. 12. Similarly, in a case where the worker selects the fixation cylinder 402 as a maintenance target on the operation panel 16, the controller 160 controls the driving mechanism 79 so that the recessed part 101 of the fixation cylinder 402 stops at the maintenance position illustrated in FIG. 13.

Operation

Next, operation of the present exemplary embodiment is described.

In a case where the worker selects the transfer cylinder 36 as a maintenance target on the operation panel 16, the controller 160 controls the driving mechanism 79 so that the recessed part 100 of the transfer cylinder 36 is located at the maintenance position illustrated in FIG. 12 within the range H3, and in a case where the worker selects the fixation cylinder 402 as a maintenance target, the controller 160 controls the driving mechanism 79 so that the recessed part 101 of the fixation cylinder 402 is located at the maintenance position illustrated in FIG. 13 within the range H4.

It is therefore possible to reduce an amount of work for stopping the recessed part 100 or 101 at the maintenance position as compared with a case where the worker stops the recessed part 100 or 101 at the maintenance position by inching the transfer cylinder 36 or the fixation cylinder 402 that is a maintenance target.

Since the maintenance position of the recessed part 100 of the transfer cylinder 36 and the maintenance position of the recessed part 101 of the fixation cylinder 402 are within a range in which the chains 49 are suspended, the recessed parts 100 and 101 may be easily accessed as compared with a case where the maintenance positions of the recessed parts 100 and 101 are outside the range in which the chains 49 are suspended.

Furthermore, since the maintenance positions of the recessed parts 100 and 101 are within the range in which the chains 49 are suspended and outside the range in which the driving force transmission mechanism part 279 or the heating roller 404 is disposed, the recessed parts 100 and 101 may be easily accessed as compared with a case where the maintenance positions of the recessed parts 100 and 101 are outside the range in which the chains 49 are suspended and within the range in which the driving force transmission mechanism part 279 or the heating roller 404 is disposed.

Other Remarks

Note that the present disclosure is not limited to the above exemplary embodiments.

For example, although the configuration in which the gripper 42 that is an example of a holding member physically holds a front end portion P1 of a sheet P has been described as an example in the above exemplary embodiments, the present disclosure is not limited to such a structure, and the gripper 42 may hold a front end of a sheet P, for example, by force of sucking air.

Furthermore, for example, although the circulating member is chains in the above exemplary embodiments, the present disclosure is not limited to this. For example, the circulating member may be a belt.

Furthermore, for example, although an inkjet system or a dry-type electrophotographic system has been described as an image formation system for forming an image on a sheet P in the above exemplary embodiments, the present disclosure is not limited to this. For example, a wet-type electrophotographic system using a liquid developer, an offset printing system, or the like may be employed.

Furthermore, for example, although maintenance targets are the transport cylinder for image formation 39, the transport cylinder for drying 302, the transfer cylinder 36, and the fixation cylinder 402 in the above exemplary embodiments, the present disclosure is not limited to these. The maintenance targets may be transport cylinders in general that are provided with a recessed part and transport a recording medium.

Furthermore, for example, the maintenance positions of the recessed parts 100 and 101 are not limited to those in the above exemplary embodiments. The maintenance position may be within a range in which the chains 49 are not suspended around a transport cylinder or may be within a range in which a peripheral member is provided.

Furthermore, the configuration of the image forming apparatus is not limited to those in the above exemplary embodiments and can be various configurations. Furthermore, the present disclosure can be implemented in various aspects without departing from the spirit of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A recording medium transport device comprising:
- a circulating member that forms a part of a transport path for transporting a recording medium;
- a holding member that is fixed to the circulating member and thereby circulates and holds a front end portion of the recording medium;
- a plurality of transport cylinders around which the circulating member is suspended and having a recessed part in which the holding member is stored; and
- a controller configured to
  - receive a selection from a user interface of any one of the plurality of transport cylinders, and
  - stop the one of the plurality of transport cylinders so that the recessed part is located at a position that allows access to the recessed part of the one of the plurality of transport cylinders for maintenance.

2. The recording medium transport device according to claim 1, wherein:
- the position is within a range in which the circulating member is suspended around the transport cylinder.

3. The recording medium transport device according to claim 2, wherein:

- a peripheral member is disposed radially outside the range in which the circulating member is suspended around the transport cylinder; and
- the position is within the range in which the circulating member is suspended around the transport cylinder and within a range in which the peripheral member is not disposed.

4. An image forming apparatus comprising:
- the recording medium transport device according to claim 1; and
- a droplet image forming part that forms a droplet image on the recording medium at an image formation position on a circulating path of the circulating member of the recording medium transport device.

5. An image forming apparatus comprising:
- the recording medium transport device according to claim 2; and
- a droplet image forming part that forms a droplet image on the recording medium at an image formation position on a circulating path of the circulating member of the recording medium transport device.

6. An image forming apparatus comprising:
- the recording medium transport device according to claim 3; and
- a droplet image forming part that forms a droplet image on the recording medium at an image formation position on a circulating path of the circulating member of the recording medium transport device.

7. The image forming apparatus according to claim 4, wherein:
- one of the plurality of transport cylinders is a transport cylinder for image formation that transports the recording medium to the image formation position.

8. The image forming apparatus according to claim 5, wherein:
- one of the plurality of transport cylinders is a transport cylinder for image formation that transports the recording medium to the image formation position.

9. The image forming apparatus according to claim 6, wherein:
- one of the plurality of transport cylinders is a transport cylinder for image formation that transports the recording medium to the image formation position.

10. The image forming apparatus according to claim 7, further comprising a drying device that dries, at a drying position, the droplet image formed on the recording medium at the image formation position,
- wherein one of the plurality of transport cylinders is a transport cylinder for drying that transports the recording medium to the drying position.

11. The image forming apparatus according to claim 8, further comprising a drying device that dries, at a drying position, the droplet image formed on the recording medium at the image formation position,
- wherein one of the plurality of transport cylinders is a transport cylinder for drying that transports the recording medium to the drying position.

12. The image forming apparatus according to claim 9, further comprising a drying device that dries, at a drying position, the droplet image formed on the recording medium at the image formation position,
- wherein one of the plurality of transport cylinders is a transport cylinder for drying that transports the recording medium to the drying position.

13. An image forming apparatus comprising:
- the recording medium transport device according to claim 1; and a developer image forming part that forms a developer image to be transferred onto the recording medium at a transfer position on a circulating path of the circulating member of the recording medium transport device.

14. An image forming apparatus comprising:

the recording medium transport device according to claim 2; and a developer image forming part that forms a developer image to be transferred onto the recording medium at a transfer position on a circulating path of the circulating member of the recording medium transport device.

15. An image forming apparatus comprising:

the recording medium transport device according to claim 3; and a developer image forming part that forms a developer image to be transferred onto the recording medium at a transfer position on a circulating path of the circulating member of the recording medium transport device.

16. The image forming apparatus according to claim 13, wherein:

the developer image forming part includes an image carrier that carries the developer image; and one of the plurality of transport cylinders is a transfer cylinder that transfers the developer image from the image carrier onto the recording medium.

17. The image forming apparatus according to claim 14, wherein:

the developer image forming part includes an image carrier that carries the developer image; and one of the plurality of transport cylinders is a transfer cylinder that transfers the developer image from the image carrier onto the recording medium.

18. The image forming apparatus according to claim 15, wherein:

the developer image forming part includes an image carrier that carries the developer image; and one of the plurality of transport cylinders is a transfer cylinder that transfers the developer image from the image carrier onto the recording medium.

19. The image forming apparatus according to claim 16, further comprising a fixation device that fixes the developer image onto the recording medium onto which the developer image has been transferred at the transfer position, wherein the fixation device includes a fixation cylinder, which is one of the plurality of transport cylinders, and a heating member that fixes the developer image by holding the recording medium between the heating member and the fixation cylinder.

20. The image forming apparatus according to claim 17, further comprising a fixation device that fixes the developer image onto the recording medium onto which the developer image has been transferred at the transfer position, wherein the fixation device includes a fixation cylinder, which is one of the plurality of transport cylinders, and a heating member that fixes the developer image by holding the recording medium between the heating member and the fixation cylinder.

* * * * *